United States Patent
Park

(10) Patent No.: US 8,209,337 B2
(45) Date of Patent: Jun. 26, 2012

(54) CONTENT RECOMMENDATION APPARATUS AND METHOD USING TAG CLOUD

(75) Inventor: Jong-Hun Park, Seoul (KR)

(73) Assignees: Core Logic, Inc., Seoul (KR); SNU R&BD Foundation, Seoul (KR)

( * ) Notice: Subject to any disclaimer, the term of this patent is extended or adjusted under 35 U.S.C. 154(b) by 463 days.

(21) Appl. No.: 12/273,710

(22) Filed: Nov. 19, 2008

(65) Prior Publication Data
US 2009/0132526 A1    May 21, 2009

(30) Foreign Application Priority Data

Nov. 19, 2007    (KR) .................. 10-2007-0117987

(51) Int. Cl.
*G06F 17/30* (2006.01)
*G06F 17/00* (2006.01)

(52) U.S. Cl. .................. 707/749; 707/688; 707/727

(58) Field of Classification Search .......... 707/719, 707/726–729, 731–732, 747–751, 758, 776, 707/785, 920, 688, 705–711, 727; 705/26–27, 705/7.29–7.34; 706/45–50; 340/572.1, 568.5; 702/179
See application file for complete search history.

(56) References Cited

U.S. PATENT DOCUMENTS

| | | | | |
|---|---|---|---|---|
| 5,749,081 A | * | 5/1998 | Whiteis | 1/1 |
| 5,790,426 A | * | 8/1998 | Robinson | 702/179 |
| 6,138,128 A | * | 10/2000 | Perkowitz et al. | 715/205 |
| 6,313,745 B1 | * | 11/2001 | Suzuki | 340/572.1 |
| 6,873,967 B1 | * | 3/2005 | Kalagnanam et al. | 705/26.44 |
| 6,981,040 B1 | * | 12/2005 | Konig et al. | 709/224 |
| 7,231,419 B1 | * | 6/2007 | Gheorghe et al. | 709/203 |
| 7,584,159 B1 | * | 9/2009 | Chakrabarti et al. | 706/45 |
| 2002/0010625 A1 | * | 1/2002 | Smith et al. | 705/14 |
| 2002/0065721 A1 | * | 5/2002 | Lema et al. | 705/14 |
| 2003/0105682 A1 | * | 6/2003 | Dicker et al. | 705/27 |
| 2003/0149612 A1 | * | 8/2003 | Berghofer et al. | 705/10 |
| 2004/0076936 A1 | * | 4/2004 | Horvitz et al. | 434/236 |
| 2005/0071328 A1 | * | 3/2005 | Lawrence | 707/3 |

(Continued)

FOREIGN PATENT DOCUMENTS

EP    2184693    *    5/2010

(Continued)

OTHER PUBLICATIONS

Zhiyong Zhang et al. "Hybrid Query Session and Content-Based Recommendations for Enhanced Search",2006 IEEE International Conference on Fuzzy Systems, pp. 2068-2074.*

(Continued)

*Primary Examiner* — Srirama Channavajjala
(74) *Attorney, Agent, or Firm* — Edwards Wildman Palmer LLP

(57) ABSTRACT

Content recommendation apparatus and methods using a tag cloud provide a content recommendation service via a network. The apparatus includes a content tag cloud generating module configured to generate a content tag cloud by analyzing a tag assigned to each content and accumulating frequencies per tag of each content. The apparatus also includes a user tag cloud generating module configured to generate a user tag cloud by accumulating frequencies per tag of contents used by a user. The apparatus further includes a similarity computing module and a recommending module. The similarity computing module is configured to compute a similarity between users using the user tag cloud, and the recommending module is configured to recommend content by computing a probability that a target user will use a specific content based on the computed similarity between users.

7 Claims, 3 Drawing Sheets

U.S. PATENT DOCUMENTS

| | | | |
|---|---|---|---|
| 2005/0125307 A1* | 6/2005 | Hunt et al. | 705/26 |
| 2005/0267818 A1* | 12/2005 | Kaplan | 705/26 |
| 2006/0020662 A1* | 1/2006 | Robinson | 709/203 |
| 2006/0200556 A1* | 9/2006 | Brave et al. | 709/224 |
| 2006/0253590 A1* | 11/2006 | Nagy et al. | 709/226 |
| 2006/0271953 A1* | 11/2006 | Jacoby et al. | 725/34 |
| 2007/0039023 A1* | 2/2007 | Kataoka | 725/46 |
| 2007/0078832 A1 | 4/2007 | Ott, IV et al. | |
| 2008/0222105 A1 | 9/2008 | Matheny | |
| 2008/0242279 A1* | 10/2008 | Ramer et al. | 455/414.2 |
| 2009/0024962 A1* | 1/2009 | Gotz | 715/838 |
| 2009/0077081 A1* | 3/2009 | Sarma et al. | 707/8 |
| 2010/0228691 A1* | 9/2010 | Yang et al. | 706/12 |
| 2011/0191311 A1* | 8/2011 | Polonsky et al. | 707/706 |

FOREIGN PATENT DOCUMENTS

| | | |
|---|---|---|
| JP | 2001-142890 A | 5/2001 |
| JP | 2005-196415 A | 7/2005 |
| JP | 2006-302097 A | 11/2006 |
| JP | 2007-213401 A | 8/2007 |
| KR | 10-0720762 B1 | 5/2007 |
| WO | WO 00/36544 * | 6/2000 |
| WO | WO 00/51050 * | 8/2000 |
| WO | WO 2007/124225 * | 11/2007 |
| WO | 2008-109980 A1 | 9/2008 |

OTHER PUBLICATIONS

Sadaaki M et al. "classification and clustering of information objects based on fuzzy neighborhood system", systems, man and cybermetics, 2005 IEEEE, vol. 4, pp. 3210-3215.*

Dmitri Roussinov et al. "Automatic discovery of similarity relationships through web mining", decision support systems 35 (2003) 149-166.*

Fokker, J. et al., "Tag-Based Navigation for Peer-To-Peer Wikipedia," Electronic Proceedings of the World Wide Web 2006 Conference, [online] May 22-26, 2006, pp. 1-5, XP002518565, Edinburgh, United Kingdom, URL: http://www.cs.vu.nl/ishare/public/I-Share-P31v1.0.pdf.

Ji, A. et al., "Collaborative Tagging in Recommender Systems," Lecture Notes in Computer Science, Springer Verlag, Berlin, Germany, vol. 4830, Jan. 1, 2007, pp. 377-386, XP002486151.

Michlmayr, E. et al., "Learning User Profiles From Tagging Data and Leveraging Them for Personal(ized) Information Access," Tagging and Metadata for Social Information Organization Workshop in Conjunction with the 16$^{th}$ International World Wide Web Conference, [online] May 8-12, 2007, pp. 1-7, XP002518564, Banff, Canada, URL: http://www2007.org/workshops/paper_29.pdf.

Jennings, A. et al., "A Personal News Service Based on a User Model Neural Network," IEICE Transactions on Information and Systems, Information & Systems Society, Tokyo, Japan, vol. E75-D, No. 2, Mar. 1, 1992, pp. 198-209, XP000301167.

Lee, G. et al., "Similarity Measurement for XML Documents Using Tag Synonyms," Korea Information Science Association, vol. 34, No. 2(C) (Fall 2007).

Sugiyama, K. et al., "Adaptive Web Search Based on User Profile Constructed without Any Effort from Users," Jrl. of Electronic Information and Telecommunication, D-I vol. J87-D-I, No. 11, pp. 975-990 (2004).

* cited by examiner

CONTENT RECOMMENDATION APPARATUS AND METHOD USING TAG CLOUD

CLAIM OF PRIORITY

This application claims priority under 35 U.S.C. §119(a) to Korean Patent Application No. 10-2007-0117987, filed on Nov. 19, 2007, in the Korean Intellectual Property Office, the entire contents of which are hereby incorporated by reference.

FIELD OF THE INVENTION

The invention relates to content recommendation apparatus and methods, and in particular to content recommendation apparatus and methods that (a) compute similarities between users using tag clouds assigned to content and (b) recommend content to a user based on the computed similarities.

BACKGROUND OF THE INVENTION

As the Internet continues to increase in popularity, the amount of available content continues to increase geometrically. In particular, the number of moving image-type UCCs (User Created Content) is increasing explosively. In this environment, users with limited information and limited time are having difficulty finding content that satisfies their interests. Recommendation systems are thus being used more and more to recommend appropriate content to users based on their inclinations and preferences. Known recommendation systems recommend content by determining a user neighborhood having similar inclinations as a target user and utilizing a relationship between the target user and a user of the user neighborhood.

Conventional recommendation technology, however, has the following limitations. First, in the case of explicit data collection, the actual number of contents that are purchased, used, and/or evaluated by users is often small and, thus, the amount of content that can be recommended is limited.

Also, conventional recommendation technologies often select users similar to a target user based on those users who used the same content as the target user. Thus, the range of similar users may be limited and, consequently, the range of recommendable content also may be limited, possibly resulting in the recommendation of undesired content.

Moreover, in cases where the number of contents is larger than the number of users, the number of users who used the same content as the target user is usually small. Thus, finding users similar to a target user is difficult.

Another limitation of conventional recommendation technologies is that similar users are selected on the basis of content used by a target user in the past. Then, only a content related to the subject in which the target user had an interest in the past is recommended.

And because similar users are selected from those who used the same content as a target user, coverage for content beyond that actually used by the similar and target users is very low, for example, only about 10% to 30%.

SUMMARY OF THE INVENTION

An object of the invention is to provide content recommendation apparatus and methods that increase coverage for contents by using tag clouds assigned to the contents. In those cases where the amount of content is large, the invention increases recommendation performance by effectively finding users similar to a target user.

A content recommendation apparatus according to a first aspect of the invention provides a content recommendation service via a network, and includes a content tag cloud generating module configured to generate a content tag cloud by analyzing a tag assigned to each content and accumulating frequencies per tag of each content. Frequencies per tag is the number of times a particular tag was assigned by users to a given content. The content recommendation apparatus also includes a user tag cloud generating module, a similarity computing module, and a recommending module. The user tag cloud generating module is configured to generate a user tag cloud by accumulating frequencies per tag of contents used by a user. The similarity computing module is configured to compute a similarity between users using the user tag cloud, and the recommending module is configured to recommend a content by computing a probability that a target user will use a specific content based on the computed similarity between users.

A content recommendation method according to a second aspect of the invention provides a content recommendation service via a network, and includes (a) generating a content tag cloud by analyzing a tag assigned to each content and accumulating frequencies per tag of each content; (b) generating a user tag cloud by accumulating frequencies per tag of contents used by a user; (c) computing a similarity between users using the user tag cloud; and (d) recommending a content by computing a probability that a target user will use a specific content based on the computed similarity between users.

BRIEF DESCRIPTION OF THE DRAWINGS

The features and advantages of the invention will become more apparent upon consideration of the detailed description taken in conjunction with the accompanying drawings, in which like reference characters refer to like parts throughout, and in which.

DETAILED DESCRIPTION OF THE INVENTION

Figure 1:
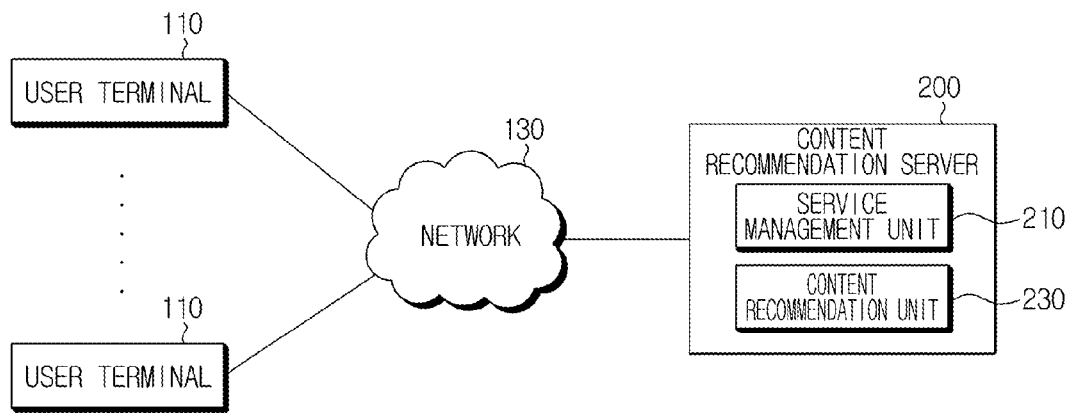
FIG. 1 illustrates a network configuration of a content recommendation system according to an embodiment of the invention.

FIG. 1 shows a network configuration of a content recommendation system in accordance with the invention. The content recommendation system includes a plurality of user terminals 110 coupled to a content recommendation server 200 via a network 130. Network 130 is capable of sending and receiving content and may be, for example, the Internet, a mobile communication network, or a wired or wireless network. User terminals 110 preferably have a wired or wireless Internet browser, and can be connected to the content recommendation server 200 using the browser. User terminals 110 are capable of receiving content provided by the content recommendation server 200, and may be, for example, a desktop PC (personal computer), a notebook PC, a PDA (personal digital assistant), or a mobile communication terminal. Content recommendation server 200 recommends content to users at user terminals 110. Content provided by content recommendation server 200 may include a moving image, a still image, a sound source (for example, an MP3 file), or an advertisement.

The content recommendation server 200 provides a Web site including content and a content recommendation service to user terminals 110 connected to server 200 via network 130. As shown in FIG. 1, content recommendation server 200 includes a service management unit 210 and a content recommendation unit 230 in accordance with the invention. The service management unit 210 stores and manages various content to be provided to a plurality of user terminals 110. When a user terminal 110 is connected, service management unit 210 provides a Web site including content to the user terminal 110. The service management unit 210 provides the user terminal 110 with a tag setting interface to enable a user to assign a related word (i.e., a tag) to each content included in the Web site, and stores and manages the tag assigned to each content. A set of tags assigned to each content is stored and managed as a tag cloud of each content. A user can assign, for example, a related word or words as a tag to a specific music video, such as, "sexy," "wonder girls," or "dance." The service management unit 210 then stores and manages "sexy," "wonder girls" and "dance" as a tag cloud of that music video.

The service management unit 210 also provides content to a plurality of user terminals 110, and generates, stores, and manages a tag cloud for each user. Where any one user uses a plurality of contents, the service management unit 210 synthesizes tag clouds of contents used by the user, generates a tag cloud for the corresponding user, and stores and manages the tag cloud. In generation of a tag cloud for each user, the service management unit 210 manages a generation frequency of each tag of the tag cloud.

The content recommendation unit 230 selects a user neighborhood having similar inclinations using tag clouds of users that are generated, stored and managed by the service management unit 210. The content recommendation unit 230 also recommends content to users in the similar user neighborhood based on a list of contents used by the users in the user neighborhood. A content recommendation algorithm is described in detail below.

Figure 2:
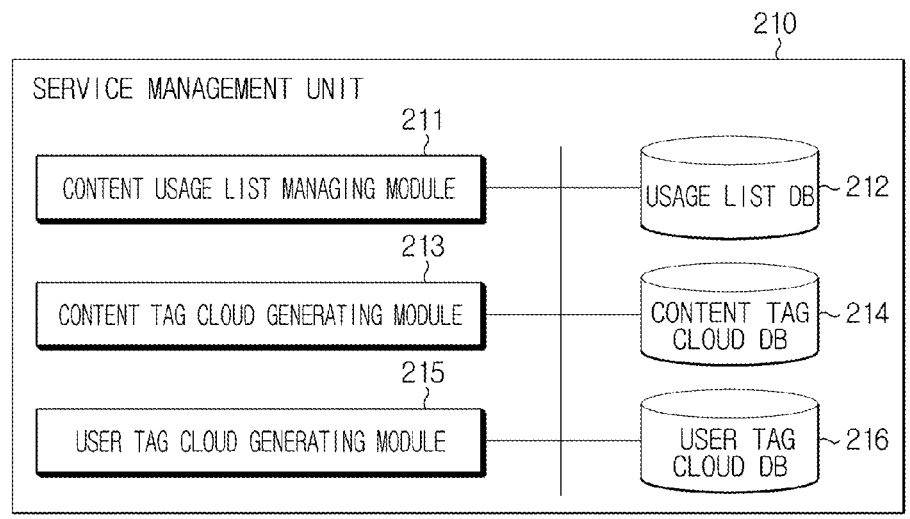
FIG. 2 illustrates an embodiment of the service management unit of FIG. 1.

FIG. 2 shows a configuration of the service management unit 210 of FIG. 1 according to an embodiment of the invention. Service management unit 210 includes a content usage list managing module 211, a content tag cloud generating module 213, a user tag cloud generating module 215, a usage list database 212, a content tag cloud database 214, and a user tag cloud database 216.

The content usage list managing module 211 registers in the usage list database 212 a list of contents used by a user among various contents provided to a plurality of the user terminals 110 by the content recommendation server 200. The content usage list managing module 211 also manages the content usage list. When a user terminal 110 connects to the content recommendation server 200 and uses a specific content, the content usage list managing module 211 indicates that usage in a user identification information (for example, cookie information, ID, and so on) of the user terminal 110, and stores the content usage information in the usage list database 212. The usage list database 212 maps an identification information of a content used by a user with each user identification information, and stores the mapping information.

The content tag cloud generating module 213 registers in the content tag cloud database 214 tags assigned to various content provided to a plurality of user terminals 110 by the content recommendation server 200. The content tag cloud generating module 213 manages the tags, provides the user terminals 110 with an interface to enable a user to directly assign a tag to a content, and receives the tag assigned to the content from the user.

The content tag cloud generating module 213 receives a user-defined tag as a tag of a content. Alternatively, the content tag cloud generating module 213 provides a user with a plurality of preset tags, and receives any one tag or a plurality of tags as a tag of a content. The content tag cloud generating module 213 stores in the content tag cloud database 214 frequencies of tags assigned to each content by a user. The content tag cloud database 214 maps an identification information of each content with frequencies of tags assigned to a corresponding content, and stores the mapping information. For example, where a user #1 assigns tags of "Park Ji-Sung" and "Manchester United" to a moving image A, and a user #2 assigns tags of "Football" and "Park Ji-Sung" to the moving image A, the following is constructed in the content tag cloud database 214 as a tag cloud of the moving image A: {Park Ji-Sung2. Manchester United1. Football1}.

The content tag cloud constructed by the content tag cloud generating module 213 is represented by Equation 2 below. Specifically, assuming that $U=\{u_1, u_2, \ldots, u_l\}$ is a neighborhood of users, $V=\{v_1, v_2, \ldots, v_m\}$ is a set of contents, $T=\{t_1, t_2, \ldots, t_n\}$ is a set of tags, and $f_{ijk}$ is a variable having a value of '1' when a user $u_i$ assigns a tag $t_k$ to a content $v_j$, or otherwise having a value of '0', a tag cloud $VTC_j$ of content $v_j$ is represented by the following Equation 2.

$$VTC_j = \left( \sum_{i=1}^{l} f_{ij1}, \sum_{i=1}^{l} f_{ij2}, \ldots, \sum_{i=1}^{l} f_{ijn} \right) \quad \text{Equation 2}$$

That is, $VTC_j$ is an n-dimensional vector indicating the total frequency of each tag $t_k$ that users have assigned to a specific content $v_j$.

Whenever a user uses a content, the user tag cloud generating module 215 accumulates tag clouds assigned to the contents used by the user, and stores the tag clouds in the user tag cloud database 216 as a user tag cloud. The user tag cloud generating module 215 accumulates the frequency of each tag constructed for contents used by a user according to tag, and stores the frequencies of the entire tags in the user tag cloud database 216 as a user tag cloud.

The user tag cloud constructed by the user tag cloud generating module 215 is represented by Equation 3 below. Assuming that a tag cloud of a user $u_i$ is $UTC_i$, when the user $u_i$ signs up, the tag cloud $UTC_i$ (which is an n-dimensional vector) is initialized to 0. Whenever the user $u_i$ uses a content $v_j$, the tag cloud $UTC_i$ of the user $u_i$ is updated according to Equation 3.

$$UTC_i \leftarrow UTC_i + NVTC_j \quad \text{Equation 3}$$

Here, $NVTC_j$ is obtained by normalizing $VTC_j$, which is defined in Equation 4 below:

$$NVTC_j = \frac{1}{\sum_{k=1}^{n}\sum_{i=1}^{l} f_{ijk}} VTC_j$$

$$= \left( \frac{\sum_{i=1}^{l} f_{ij1}}{\sum_{k=1}^{n}\sum_{i=1}^{l} f_{ijk}}, \frac{\sum_{i=1}^{l} f_{ij2}}{\sum_{k=1}^{n}\sum_{i=1}^{l} f_{ijk}}, \ldots, \frac{\sum_{i=1}^{l} f_{ijn}}{\sum_{k=1}^{n}\sum_{i=1}^{l} f_{ijk}} \right)$$

Equation 4

Synthesizing Equations 3 and 4. $UTC_i$ is the distribution of interest of user $u_i$ in the subject of each tag. The use of the content $v_j$ by the user $u_i$ means that the user $u_i$ has an interest in the subject of the content represented as $NVTC_j$. Thus, Equation 3 represents a process in which an interest of a user is updated through a content usage behavior.

For example, assume that {Park Ji-Sung2. Manchester United1, Football1} is constructed as a tag cloud of a moving image A and that a new user #1 uses the moving image A. A tag cloud of user #1 is normalized and constructed as {Park Ji-Sung1/2. Manchester United1/4. Football1/4}. And, in the case where user #1 uses a moving image B having a tag cloud of {Lee Young-Pyo2. Tottenham1, Football1}, the tag cloud of the moving image B {Lee Young-Pyo2. Tottenham1, Football1} is normalized and added to the tag cloud of user #1: {Park Ji-Sung1/2, Manchester United1/4. Football1/4}. Finally, {Park Ji-Sung1/2. Manchester United1/4. Lee Young-Pyo1/2. Tottenham1/4. Football1/2} is constructed as a tag cloud of user #1. Here, a frequency of tags is arranged in a tag cloud of an n-dimensional vector according to a process for generating the entire tags.

Figure 3:
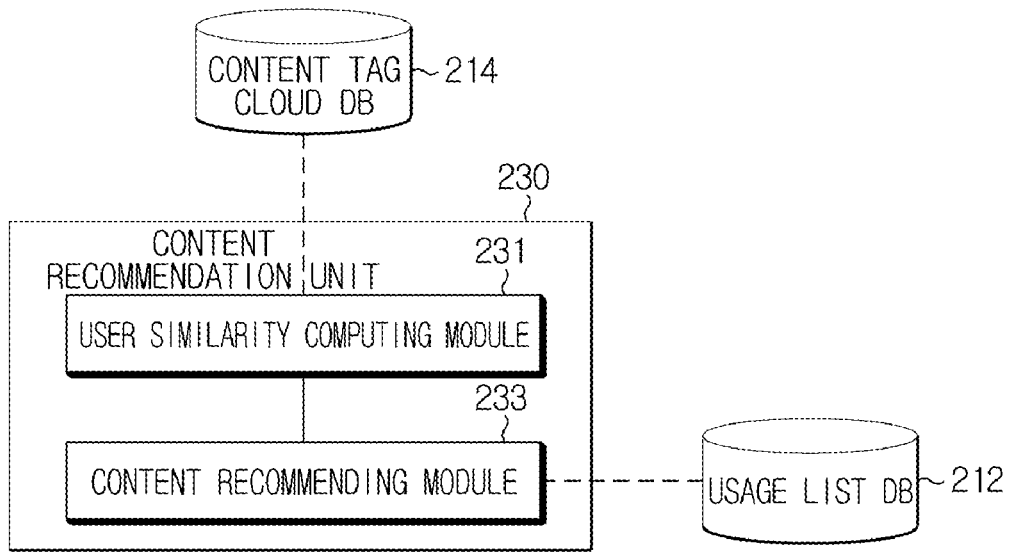
FIG. 3 illustrates an embodiment of the content recommendation unit of FIG. 1.

FIG. 3 shows a configuration of the content recommendation unit 230 of FIG. 1 according to an embodiment of the invention. Content recommendation unit 230 includes a user similarity computing module 231 and a content recommending module 233. User similarity computing module 231 computes a similarity between each user using tag clouds of the users stored in the user tag cloud database 216. The user similarity computing module 231 computes a tag cloud similarity between two arbitrary users $u_i$ and $u_{i'}$ based on user tag clouds stored in the user tag cloud database 216. The tag cloud similarity is represented by Equation 5 below.

Assuming that a tag cloud similarity between two arbitrary users $u_i$ and $u_{i'}$ is $sim(u_i, u_{i'})$, a tag cloud of a user $u_i$ is $UTC_i = (\alpha_1^i, \alpha_2^i, \ldots, \alpha_n^i)$ and a tag cloud of a user $u_{i'}$ is $UTC_{i'} = (\alpha_1^{i'}, \alpha_2^{i'}, \ldots, \alpha_n^{i'})$, $sim(u_i, u_{i'})$ can be computed as a cosine value of each angle between two vectors as shown in Equation 5.

$$sim(u_i, u_{i'}) = \cos(UTC_i, UTC_{i'})$$

$$= \frac{UTC_i \cdot UTC_{i'}}{\|UTC_i\|_2 \times \|UTC_{i'}\|_2}$$

$$= \frac{\sum_{k=1}^{n} \alpha_k^i \alpha_k^{i'}}{\sqrt{\sum_{k=1}^{n} (\alpha_k^i)^2} \sqrt{\sum_{k=1}^{n} (\alpha_k^{i'})^2}}$$

Equation 5

Here, $UTC_i \cdot UTC_{i'}$ is a dot product of two vectors $UTC_i$ and $UTC_{i'}$.

The content recommending module 233 computes for all contents a probability that a target user will use a specific content using a computed similarity by the user similarity computing module 231 between the target user and an arbitrary user. The content recommending module 233 recommends a content to the target user in a descending order of probability. At this time, the content recommending module 233 excludes content that the target user had already used. And, in computation of a probability that a target user will use a specific content, when a recommendation list should be changed promptly, the content recommending module 233 updates the probability whenever the target user uses a new content, or otherwise, simultaneously updates probabilities of all users in a type of periodic update processing.

A process in which the content recommending module 233 computes a probability that a target user will use a specific content is represented by Equation 6:

$$\pi_{i,j} = k \sum_{u_{i'} \in U} sim(u_i, u_{i'}) \times p_{i',j}$$

Equation 6

Here, U is a user neighborhood similar to a target user $u_i$, and $p_{i',j}$ is a variable indicating whether or not a user $u_i$ used a specific content $v_j$. Where user $u_i$ used the specific content $v_j$-$p_{i',j}$ is '1', and where user $u_i$ did not use the specific content $v_j$-$p_{i',j}$ is '0'. The normalization constant, 'k,' is as follows:

$$k = 1 \Big/ \sum_{u_{i'} \in U} sim(u_i, u_{i'}).$$

The content recommending module 233 generally determines as a user neighborhood U similar to a target user, a neighborhood of users $S_i$ who have used at least two contents among a set of contents used by the target user $u_i$. However, where the number of contents is overwhelmingly larger than the number of users, the number of users who have used at least two contents is remarkably small, and thus it is difficult to find users similar to the target user. And where the target user has used just one content, it is impossible to determine a user neighborhood U. Therefore, the content recommending module 233 determines a user neighborhood U as follows:

(1) where $|S_i| \geq N$, $U = S_i$; and
(2) where $|S_i| < N$, U is a neighborhood of N users most similar to the target user based on the similarity computed in Equation 5.

Here, N is a constant value determined experimentally to maximize the performance of the recommendation system.

Figure 4:
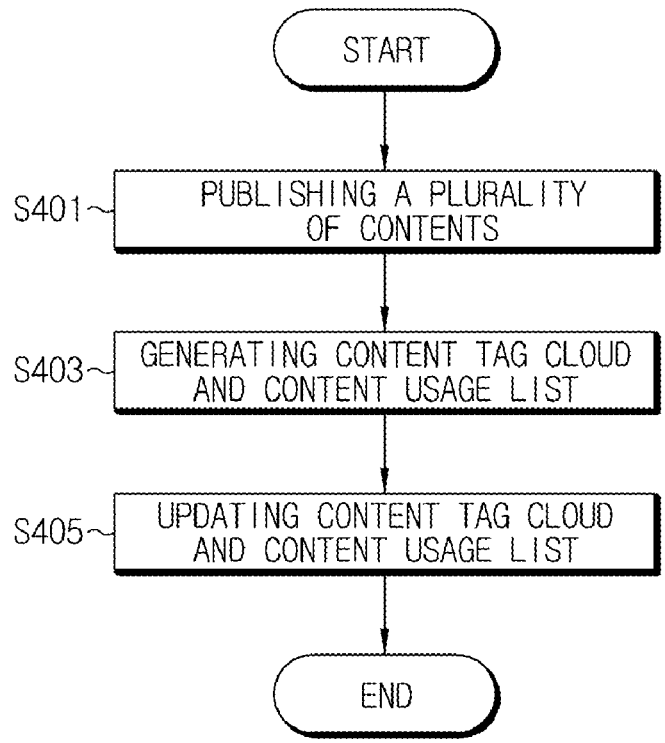
FIG. 4 is a flow chart illustrating a process of constructing a content tag cloud according to an embodiment of the invention.

FIG. 4 illustrates a process of constructing a content tag cloud in accordance with the invention. Content recommendation server 200 publishes a plurality of contents stored therein on a web page such as a home page (S401). The contents may be self-created contents and/or UCCs (User Created Contents) and may include moving images, photographs, or broadcasts. When the plurality of contents are published on a home page and so on by the content recommendation server 200, users can connect to the home page of the content recommendation server 200 using user terminals 110 and can access/use the plurality of contents.

When a user uses a specific content, the content recommendation server 200 provides the user terminal 110 with a related interface to enable the user to assign a tag that indicates features of the corresponding content. More particularly, the content recommendation server 200 provides an interface to enable the user to directly define a tag of the content, or offers the user a plurality of predefined tags from which to choose. After the tag is defined or chosen by the user, the content recommendation server 200 receives the tag of the content.

When the user uses specific content and assigns a tag to the content through the interface, the content recommendation server 200 stores the assigned tag and its generation frequency as a tag cloud of the corresponding content. The content recommendation server 200 also updates and stores a content usage list (S403). For example, after a user #1 uses a moving image A and assigns a tag {Park Ji-Sung, Football} to the corresponding moving image A, the content recommendation server 200 stores the tag {Park Ji-Sung, Football} and its generation frequency {1, 1} for the moving image A.

Next, when another user uses the same content and assigns a tag to the content through the interface, the content recommendation server 200 updates the stored tag cloud of the corresponding content and the stored content usage list (S405). That is, the content recommendation server 200 updates a tag of the content, its generation frequency, and the content usage list. For example, assume a tag of a stored tag cloud of a moving image A is {Park Ji-Sung, Football} and its generation frequency is {1, 1}. When a new tag {Park Ji-Sung, Manchester United} is assigned to the moving image A, the tag is updated to {Park Ji-Sung, Football, Manchester United} and its generation frequency is updated to {2, 1, 1}.

The above-mentioned process is repeatedly performed on all contents used by all users to construct tag clouds and content usage lists for those contents. This process is represented by Equation 2 above.

Figure 5:
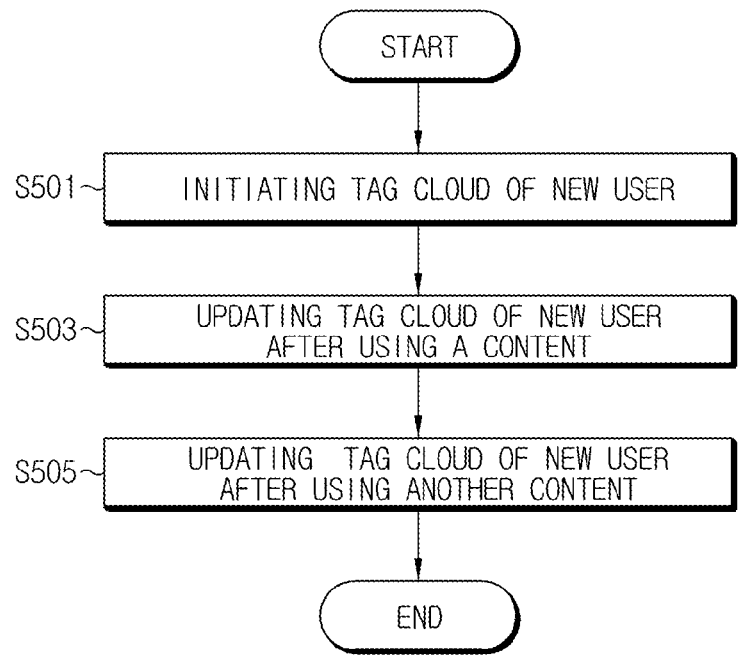
FIG. 5 is a flow chart illustrating a process of constructing a user tag cloud according to an embodiment of the invention.

FIG. 5 illustrates a process of constructing a user tag cloud in accordance with the invention. This process begins after tag clouds of all contents provided by the content recommendation server 200 are constructed as described above with respect to FIG. 4. When a new user uses a content provided by the content recommendation server 200, a tag cloud of the corresponding new user is then constructed. As shown in FIG. 5, when a new user connects to the content recommendation server 200, the content recommendation server 200 initializes an n-dimensional (equal to the number of tags generated by the content recommendation server 200) tag cloud corresponding to the new user (S501).

Subsequently, when the new user uses any one of the contents provided by the content recommendation server 200, the content recommendation server 200 updates the tag cloud of the new user by adding a tag cloud of a content used by the new user to the initialized tag cloud of the new user (S503). In some implementations, the content recommendation server 200 normalizes a tag generation frequency of a content and adds the normalized tag generation frequency to a tag generation frequency of the new user. For example, assume a new user uses a moving image A having a tag of {Park Ji-Sung, Football, Manchester United} and a tag generation frequency of {2, 1, 1}. The tag of the new user is {Park Ji-Sung, Football, Manchester United} and the associated tag generation frequency is {2/4, 1/4, 1/4}={0.5, 0.25, 0.25}.

When the new user uses another content provided by the content recommendation server 200, the content recommendation server 200 accumulates a tag cloud of that other content on the tag cloud of the new user that was generated at S503 to update the tag cloud of the new user (S505). At this time, the content recommendation server 200 preferably normalizes the tag generation frequency of the corresponding content and accumulates the normalized tag generation frequency on the tag generation frequency of the new user.

The above-described process is performed equally for all users to construct tag clouds for those users. This is represented by Equations 3 and 4 above.

Figure 6:
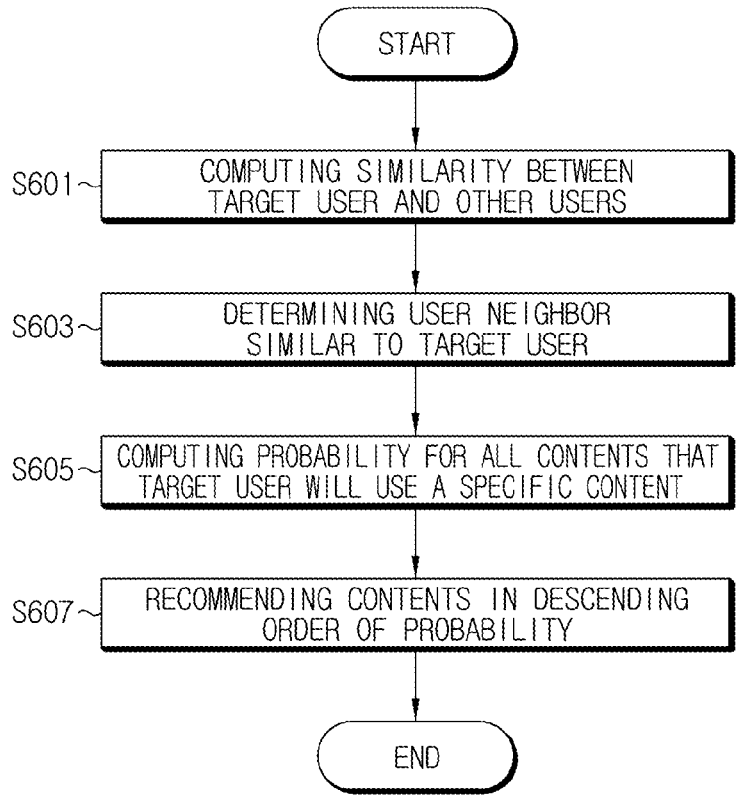
FIG. 6 is a flow chart illustrating a process for recommending content according to an embodiment of the invention.

FIG. 6 illustrates a process of recommending content in accordance with the invention. When tag clouds of users are constructed as described above with respect to FIG. 5, the content recommendation server 200 recommends content of interest to any one user (hereinafter referred to as a target user). To do so, content recommendation server 200 first computes a "similarity" between the target user and other users based on user tag clouds (S601). The content recommendation server 200 computes as a similarity cosine values of angles between a tag cloud vector of the target user and tag cloud vectors of other users. The computed similarity is represented above by Equation 5.

The content recommendation server 200 then determines a user neighbor having a similar inclination to the target user (S603). Assuming that a user neighbor is $S_i$, who has used at least two contents among a set of contents used by the target user, a user neighborhood U similar to the target user is determined as follows:

(1) where $|S_i| \geq N$, $U=S_i$
(2) where $|S_i| < N$, U is a neighborhood of N users most similar to the target user based on the computed similarity.

Here, N is a constant determined experimentally to maximize the performance of the recommendation system.

After the user neighbor is determined, the content recommendation server 200 computes a probability for all contents not used in the past by the target user that the target user will use a content based on (a) similarity between the target user and users in the similar user neighborhood and (b) content usage lists of the users of the similar user neighborhood (S605). This is represented by Equation 6 above.

Next, the content recommendation server 200 recommends a content to the target user in a descending order of probability based on the computed probabilities for all contents that the target user will use a content (S607). The content recommendation server 200 may recommend to the target user all contents in order or some contents of higher rank.

Although this embodiment shows that the content recommendation server 200 recommends individual content to the target user, the invention is not limited in this regard. After determining content to be recommended to the target user, the content recommendation server 200 may also recommend to a user a package of items having a large amount of content or a web page having a large amount of content in addition to the determined recommended content. Thus, the content recommendation unit 230 of FIG. 1 may include a package and shop recommending module for recommending to a user a package of items or a web page having a large amount of content that may be additionally recommended to the target user by the content recommending module 233.

In sum, the invention (a) generates and updates a tag cloud of a user according to content usage type of the user based on a tag cloud assigned collectively to content by a plurality of users, (b) measures similarities between users, and (c) recommends more suitable and appropriate content to users.

As mentioned above, the content recommendation method according to the invention deduces similarities between two users using a tag cloud, and although the two users did not use the same content, the users can be identified as user neighbors having similar inclinations. Conventionally, similarities between two users was deduced using an average or statistical value of evaluations, feedback, etc. given by users to the same content or purchase information of the same content by the users. However, such conventional methods has low coverage for a large set of contents, while the invention advantageously has high coverage for a large set of contents.

The recommendation apparatus and method according to the invention may be incorporated as computer readable code on a computer readable storage medium. The computer readable storage medium includes all kinds of storage devices for storing data readable by a computer system. For example, the computer readable medium may be a CD-ROM (compact disc read only memory), RAM (random access memory), ROM (read only memory), floppy disc, hard disc, or magneto-optical disc.

While this specification contains many specifics, these should not be construed as limitations on the scope of the invention or of what may be claimed, but rather, they should be construed as descriptions of features that may be specific to particular embodiments of the invention. Certain features that are described herein in the context of separate embodiments may also be implemented in a single embodiment. Conversely, various features that are described in the context of a single embodiment may also be implemented in multiple embodiments separately or in any suitable subcombination. Moreover, although features may have been described above as acting in certain combinations and even initially claimed as such, one or more features from a claimed combination may in some cases be excised from the combination, and the claimed combination may be directed to a subcombination or a variation of a subcombination.

Similarly, while processes are depicted in the drawings in a particular order, this should be understood as requiring that such processes be performed in the particular order shown or in sequential order, or that all illustrated operations be performed, to achieve desirable results. Note that in certain circumstances, multitasking and parallel processing may be possible and advantageous. Moreover, the separation of various system components in the embodiments described above should not be understood as requiring such separation in all embodiments, and it should be understood that the described program components and systems can generally be integrated together in a single software product or packaged into multiple software products.

Although only a few implementations and examples are described above, other implementations, enhancements, and variations may be made by those of ordinary skill in the art that would still be within the scope of the invention. The invention is therefore only limited by the following claims.

What is claimed is:

1. Content recommendation apparatus, the apparatus comprising:
    a content recommendation server providing a content recommendation service and recommending content via a network; and
    a plurality of user terminals receiving the content provided by the content recommendation server via the network, wherein the content recommendation server comprises
    a content tag cloud generating module including a processor to generate a content tag cloud by analyzing a tag assigned to each content and accumulating frequencies per tag of each content, wherein a plurality of tags as to one content are created by a plurality of users and accumulated as the content tag cloud as to the one content and are associated with words related to the content;
    a user tag cloud generating module including a processor to generate a user tag cloud by accumulating frequencies per tag of contents used by a user;
    a similarity computing module including a processor to compute a similarity between users using the user tag cloud; and
    a recommending module including a processor to recommend a content by computing a probability that a target user will use a specific content based on the computed similarity between users,
    wherein, in the accumulation of frequencies per tag of contents used by a user, the user tag cloud generating module normalizes a frequency per tag of a content used by the user and accumulates the normalized frequency per tag,
    wherein the recommending module determines a user neighborhood similar to a target user and recommends a content based on a similarity between the target user and a user in the determined user neighborhood, and
    wherein the recommending module determines a user neighborhood based on users who have used at least two contents in a set of contents used by the target user and determines N users from the user neighborhood most similar to the target user based on the similarity between users computed by the similarity computing module.

2. The content recommendation apparatus of claim 1 wherein the similarity computing module computes a cosine value of an angle between two vectors of tag clouds of two users.

3. The content recommendation apparatus of claim 1 further comprising a second recommending module configured to recommend a package of items or an online shop having a large amount of content recommended by the recommending module.

4. A content recommendation method of a content recommendation apparatus, the apparatus comprising:
    a content recommendation server providing a content recommendation service and recommending content via a network; and
    a plurality of user terminals receiving the content provided by the content recommendation server via the network, the method comprising:
    analyzing a tag assigned to each content and accumulating frequencies per tag of each content to generate a content tag cloud by a processor included in a content cloud generating module of the content recommendation server, wherein a plurality of tags as to one content are created by a plurality of users and accumulated as the content tag cloud as to the one content and are associated with words related to the content;
    accumulating frequencies per tag of contents used by a user to generate a user tag cloud by a processor included in a user tag cloud generating module of the content recommendation server;
    computing a similarity between users using the user tag cloud by a processor included in a similarity computing module of the content recommendation server; and
    computing a probability that a target user will use a specific content based on the computed similarity between users to recommend a content by a processor included in a recommendation module of the content recommendation server,
    wherein, in accumulation of frequencies per tag of contents used by a user, generating the user tag cloud normalizes a frequency per tag of a content used by the user and accumulates the normalized frequency per tag,
    wherein the recommending a content comprises: determining a user neighborhood similar to a target user; and recommending a content based on a similarity between the target user and a user in the determined user neighborhood,
    wherein a user neighborhood is determined based on users who have used at least two contents in a set of contents used by the target user, and wherein N users are determined from the user neighborhood most similar to the target user based on the similarity between users computed by the similarity computing module.

5. The content recommendation method of claim 4 wherein computing the similarity comprises computing a cosine value of an angle between two vectors of tag clouds of two users as similarity.

6. The content recommendation method of claim 4, further comprising: recommending a package of items or an online shop having a large amount of content recommended in the recommending step.

7. A computer readable storage medium having a computer program stored thereon for implementing a content recommendation function using a tag cloud in a computer with a processor, the function comprising:

generating a content tag cloud by analyzing a tag assigned to each content and accumulating frequencies per tag of each content to generate a content tag cloud by a processor included in a content cloud generating module of the content recommendation server, wherein a plurality of tags as to one content are created by a plurality of users and accumulated as the content tag cloud as to the one content and are associated with words related to the content generating a user tag cloud by accumulating frequencies per tag of contents used by a user to generate a user tag cloud by a processor included in a user tag cloud generating module of the content recommendation server;

computing a similarity between users using the user tag cloud by a processor included in a similarity computing module of the content recommendation server; computing a similarity between users using the user tag cloud by a processor included in a similarity computing module of the content recommendation server;

computing a probability that a target user will use a specific content based on the computed similarity between users to recommend a content by a processor included in a recommendation module of the content recommendation server, wherein, in accumulation of frequencies per tag of contents used by a user, generating the user tag cloud normalizes a frequency per tag of a content used by the user and accumulates the normalized frequency per tag, wherein the recommending a content comprises: determining a user neighborhood similar to a target user; and recommending a content based on a similarity between the target user and a user in the determined user neighborhood determining a user neighborhood based on users who have used at least two contents in a set of contents used by the target user; and determining N users from the user neighborhood most similar to the target user based on the similarity between users computed by the similarity computing module.

\* \* \* \* \*